April 29, 1947.  J. E. FREEBORN  2,419,890
FRICTION CLUTCH
Filed March 26, 1945  3 Sheets-Sheet 1

Inventor
J.E.FREEBORN
By
Attorneys

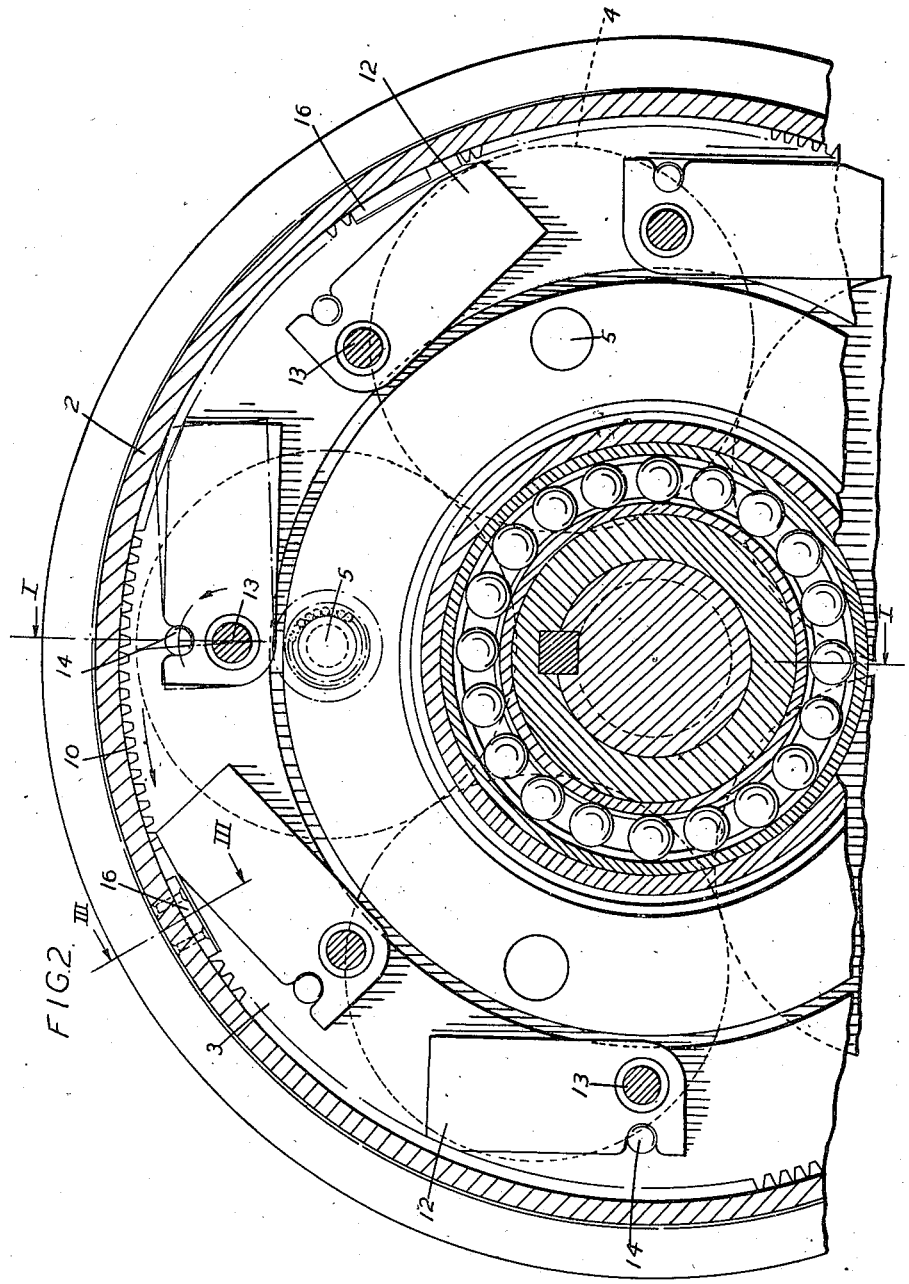

April 29, 1947. J. E. FREEBORN 2,419,890
FRICTION CLUTCH
Filed March 26, 1945 3 Sheets-Sheet 3
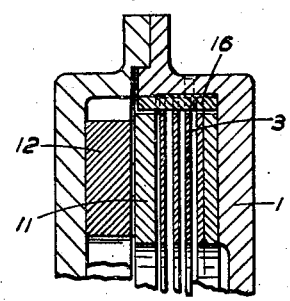
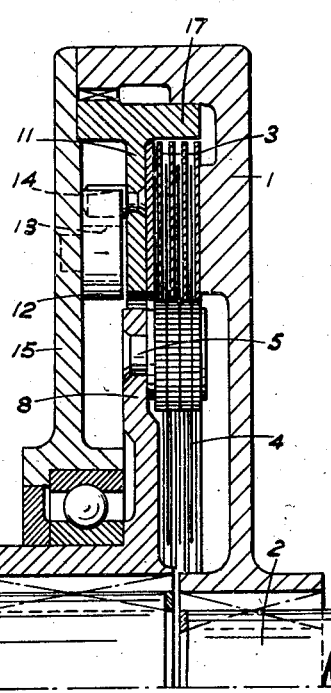
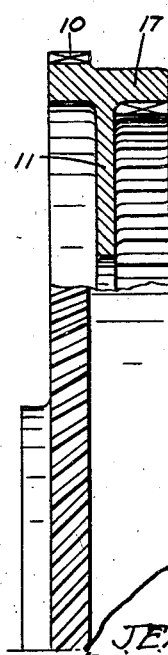
Inventor
J. E. FREEBORN Patented Apr. 29, 1947

2,419,890

UNITED STATES PATENT OFFICE 2,419,890

FRICTION CLUTCH

James Edward Freeborn, Broxbourne, England, assignor to Freeborn Power Converters Limited, London, England, a British company Application March 26, 1945, Serial No. 584,816
In Great Britain April 19, 1944

8 Claims. (Cl. 192—105)

This invention relates to friction plate clutches and is particularly concerned with mechanism for automatically operating such clutches in accordance with demands placed upon them. The main object of the invention is to enable friction clutches to be released at fairly definite speeds under torque in excess of a predetermined value.

The torque capacity of friction clutches is determined for slipping conditions, but when slipping ceases, the increase in the coefficient of friction produces a much higher torque capacity, making a wide range of speed reduction necessary to effect release under a given torque transmitted. The method already employed consisting in providing levers mounted in the clutch casing so as to transmit the effects of centrifugal force so as to act at right-angles to the plane of rotation, necessitates the provision of a number of parts which are expensive to make because they require individual fitting to ensure that the pressure is taken up uniformly and evenly.

According to the present invention, the friction clutch has one or more centrifugal bodies pivoted on its input member or on a pressure member which causes engagement of the clutch and which rotates with the driving clutch plates, while the centrifugal bodies are arranged to cause displacement between the input member of the clutch and the pressure member, depending upon the position taken up by the centrifugal bodies under the action of centrifugal force, and also the input and pressure members are formed with co-operating cam surfaces which produce axial movement of the pressure member so as to cause engagement and disengagement of the clutch. The cam surfaces are such that as the centrifugal members move out more and more under the action of centrifugal force, and the circumferential displacement of the input member of the clutch and the pressure member increases, the pressure member is moved axially so as to engage the clutch plates more and more. Conveniently, the cam surfaces may take the form of helical teeth or ribs formed on inner and outer surfaces of the input member of the clutch and the pressure member of such a pitch as to produce the desired effect of axial movement of the pressure member as the displacement between it and the input member of the clutch increases.

In order that the invention may be clearly understood and readily carried into effect, two examples of the invention applied to friction clutches as set forth in Patent No. 2,039,590, will be more fully described with reference to the accompanying drawings, in which—

Figure 2 is a cross-section on the line II—II of a form of coupling in which the variation in the coefficient of friction is not important, and the cam surfaces operate on the pressure plate for engaging and disengaging the clutch;

Figure 3 is a detailed section on the line III—III in Figure 2;

Figure 4 is an axial section through the upper part of an alternative form in which the reaction of the driving rings is utilised; and Figure 5 is a section of one half of the pressure plate employed in this construction.

Figure 1:
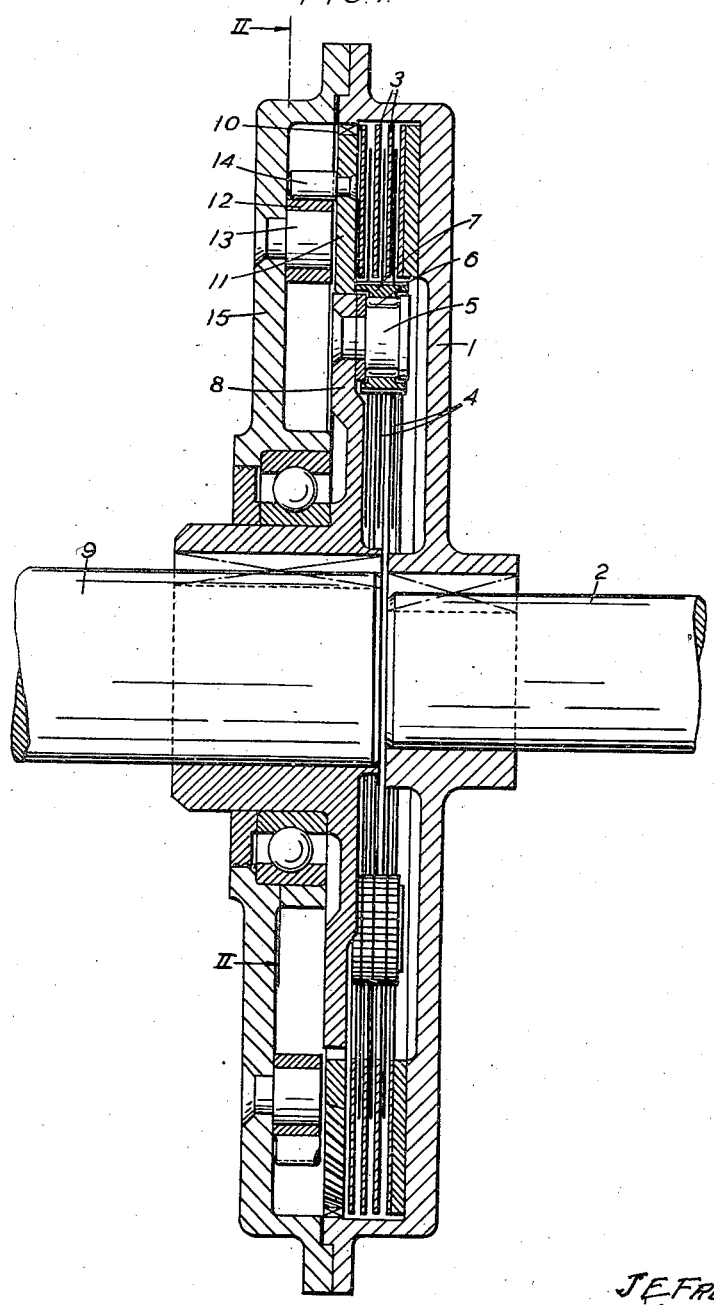
Figure 1 is an axial section on the line I—I in Figure 2.

Either form of the clutch shown in the drawings may be used on motor cars or other vehicles, or also in power transmission systems of any kind. In Figures 1 to 3, the main casing 1 is secured to the driving shaft 2 and is arranged to drive a series of annular plates 3 which are connected to the casing 1 so that they can be caused to move axially. The discs 4, which are sandwiched between the plates 3, are mounted to rotate freely on studs 5 as in Patent No. 2,039,590. Actually the stud 5 forms the inner track of a roller race 6 on which an outer hub 7 carrying the discs 4 can rotate. Each of the studs 5 is rigidly fixed in the driven carrier plate 8 which is keyed to the driven shaft 9.

A ring of helical teeth or splines 10 is formed on the inner surface of the main casing 1, and these teeth engage with similar external helical splines formed around the outer edge of a pressure plate 11 so that any angular displacement between the casing 1 and the pressure plate 11 results in axial movement of the latter, resulting in the interleaved discs 4 and the rings 3 being compressed or released depending upon the direction of such angular displacement.

The actuating members consist of weights 12 pivoted freely on studs 13 and engaging pins 14 secured in the pressure plate 11. Thus, as the weights 12 move out about the studs 13 by the effect of centrifugal force, the pressure plate 11 is displaced angularly with respect to the main casing 1 because the studs 13 are fixed in the casing cover 15 which in turn is bolted to the casing 1 around its edge. In Figures 2 and 3 can be seen the keys 16 by which the plates 3 are driven by the casing, but which yet permit the plates 3 to slide axially.

In the alternative arrangement shown in Figures 4 and 5, the plates 3 are mounted within an annular extension 17 of the pressure plate 11 so that the keys 16 shown in Figures 2 and 3 are not needed and the reaction of the driving torque opposes the centrifugal force of the pivoted weights 12. In this case, the pressure plate 11 is shown separately in Figure 5, and it will be observed that the helical teeth or splines 10 are formed on its outer surface and engage with inner similar teeth on the member 1.

It will be realised that the rotation of the member 17 relatively to the casing 1 is opposed by the reaction torque from the driven shaft 9 transmitted through the carrier 8 and the rotary discs 4 and the member 11. Consequently, if the load does not change but the speed of the driving shaft 2 increases, the clutch plates 3, 4 are pressed more firmly into engagement. However, if the speed of the driving shaft remains constant, but the load increases, the reaction torque also increases and the displacement between the carrier disc 8 and the main casing 1 is decreased and the tendency is for the clutch to be somewhat released and for slipping to take place between the clutch plates 3 and the rotary discs 4. It will be realised that the clutch as shown in the drawings and constructed in accordance with patent specification No. 2,039,590, allows slipping to take place with a minimum of wear and tear on the plates as compared with the more usual form of plate clutch.

I claim:

1. A friction plate clutch comprising in combination, an input clutch member mounted for rotation, at least one driving plate in driving relationship with said input member and mounted for axial movement, a driven or output clutch member also mounted for rotation, at least one driven plate in driving connection with said driven clutch member and movable axially into and out of engagement with said driving plate, a pressure plate disposed to effect engagement between said driving plate and said driven plate upon axial movement of said pressure plate, and centrifugal means operative between said input clutch member and said pressure plate to establish angular displacement therebetween, said input clutch member and said pressure plate being formed with co-operating cam surfaces shaped to produce relative axial movement between said input clutch member and said pressure plate upon the occurrence of angular displacement therebetween established by said centrifugal means to cause engagement and disengagement of said driving and driven plates at a predetermined speed of rotation.

2. A friction plate clutch comprising in combination, an input clutch member mounted for rotation, a flanged disc mounted for axial movement relatively to said input member, at least one driving plate in direct driving connection with said flanged disc and mounted for axial movement thereon, a driven or output clutch member also mounted for rotation, at least one driven plate in driving connection with said driven clutch member and movable axially into and out of engagement with said driving plate, said flanged disc being disposed to effect engagement between said driving plate and said driven plate upon axial movement of said flanged disc and said input clutch member and said flanged disc being formed with cooperating cam surfaces shaped to produce axial movement of said flanged disc relatively to said input clutch member upon occurrence of angular displacement therebetween to cause engagement and disengagement of said driving and driven plates and centrifugal means operative between said input clutch member and said flanged disc to produce angular displacement therebetween.

3. A friction plate clutch comprising in combination, an input clutch member mounted for rotation, at least one driving plate in driving relationship with said input member and mounted for axial movement, a driven or output clutch member also mounted for rotation, at least one driven plate in driving connection with said driven clutch member and movable axially into and out of engagement with said driving plate, a pressure plate disposed to effect engagement between said driving plate and said driven plate upon axial movement of said pressure plate and a centrifugal body pivoted on said clutch input member to move in a plane perpendicular to the axis of rotation of said member and to engage said pressure plate to establish angular displacement between said clutch input member and said pressure plate upon change of speed of rotation of the parts, said input clutch member and said pressure plate being formed with co-operating cam surfaces shaped to produce relative axial movement between said input clutch member and said pressure plate upon the occurrence of angular displacement therebetween established by said centrifugal body to cause engagement and disengagement of said driving and driven plates at a predetermined speed of rotation.

4. A friction plate clutch comprising in combination, an input clutch member mounted for rotation, a flanged disc mounted for axial movement relatively to said input member, at least one driving plate in direct driving connection with said flanged disc and mounted for axial movement thereon, a driven or output clutch member also mounted for rotation, at least one driven plate in driving connection with said driven clutch member and movable axially into and out of engagement with said driving plate, said flanged disc being disposed to effect engagement between said driving plate and said driven plate upon axial movement of said flanged disc and said input clutch member and said flanged disc being formed with co-operating cam surfaces shaped to produce axial movement of said flanged disc relatively to said input clutch member upon occurrence of angular displacement therebetween to cause engagement and disengagement of said driving and driven plates, and a centrifugal body pivoted on said clutch input member to move in a plane perpendicular to the axis of rotation of said member and to engage said flanged disc to produce angular displacement between said input clutch member and said flanged disc.

5. A friction plate clutch comprising in combination, an input clutch member mounted for rotation, at least one driving plate in driving relationship with said input member and mounted for axial movement, a driven or output clutch member also mounted for rotation, at least one driven plate in driving connection with said driven clutch member and movable axially into and out of engagement with said driving plate, a pressure plate disposed to effect engagement between said driving plate and said driven plate upon axial movement of said pressure plate and centrifugal means operative between said input clutch member and said pressure plate to establish angular displacement therebetween, said input clutch member and said pressure plate being formed with interengaging helical ribs on their adjacent surfaces to produce relative axial movement between said input clutch member and said pressure plate upon the occurrence of angular displacement between them established by said centrifugal means to cause engagement and disengagement of said driving and driven plates at predetermined speed of rotation.

6. A friction plate clutch comprising in combination, an input clutch member mounted for rotation, a flanged disc mounted for axial movement relatively to said input member, at least one driving plate in direct driving connection with said flanged disc and mounted for axial movement thereon, a driven or output clutch member also mounted for rotation, at least one driven plate in driving connection with said driven clutch member and movable axially into and out of engagement with said driving plate, said flanged disc being disposed to effect engagement between said driving plate and said driven plate upon axial movement of said flanged disc, and said input clutch member and said flanged disc being formed with inter-engaging helical ribs on their adjacent surfaces to produce relative axial movement of said flanged disc relatively to said input clutch member upon occurrence of angular displacement between them to cause engagement and disengagement of said driving and driven plates and centrifugal means operative between said input clutch member and said flanged disc to produce angular displacement therebetween.

7. A friction plate clutch comprising in combination an input clutch member mounted for rotation, at least one driving plate in driving relationship with said input member and mounted for axial movement, a driven clutch member comprising a carrier disc mounted for rotation coaxially with said input clutch member, a plurality of driven plates mounted for rotation on said carrier disc about axes eccentric to the axis of rotation of said carrier disc, said plates also being movable axially into and out of engagement with said driving plate, a pressure plate disposed to effect engagement between said driving plate and said plurality of driven plates upon axial movement of said pressure plate, and centrifugal means operative between said input clutch member and said pressure plate to establish angular displacement therebetween, said input clutch member and said pressure plate being formed with co-operating cam surfaces shaped to produce relative axial movement between said input clutch member and said pressure plate upon the occurrence of angular displacement therebetween to cause engagement and disengagement of said driving and driven plates.

8. A friction plate clutch comprising in combination an input clutch member mounted for rotation, at least one driving plate in driving relationship with said input member and mounted for axial movement, a driven clutch member comprising a carrier disc mounted for rotation coaxially with said input clutch member, a plurality of driven plates mounted for rotation on said carrier disc about axes eccentric to the axis of rotation of said carrier disc, said plates also being movable axially into and out of engagement with said driving plate, a pressure plate disposed to effect engagement between said driving plate and said plurality of driven plates upon axial movement of said pressure plate, and centrifugal means operative between said input clutch member and said pressure plate to establish angular displacement therebetween, said input clutch member and said pressure plate being formed with interengaging helical ribs to produce relative axial movement between said input clutch member and said pressure plate upon the occurrence of angular displacement between them to cause engagement and disengagement of said driving plate and said plurality of driven plates.

JAMES EDWARD FREEBORN.

REFERENCES CITED

The following references are of record in the file of this patent:

UNITED STATES PATENTS

| Number | Name | Date |
| --- | --- | --- |
| 2,039,590 | Freeborn | May 5, 1936 |
| 1,987,833 | Lansing | Jan. 15, 1934 |
| 1,998,172 | Ross | Apr. 16, 1935 |
| 1,440,160 | Lippincott | Dec. 26, 1922 |
| 2,091,919 | Freeborn | Aug. 31, 1937 |

FOREIGN PATENTS

| Number | Country | Date |
| --- | --- | --- |
| 508,050 | German | Sept. 24, 1930 |